May 1, 1962 E. A. RICHARDS 3,032,157
DOUBLE ACTING CLUTCH
Filed Dec. 18, 1959 2 Sheets-Sheet 1

Inventor:
Elmer A. Richards
By: Francis T. Drumm Atty.

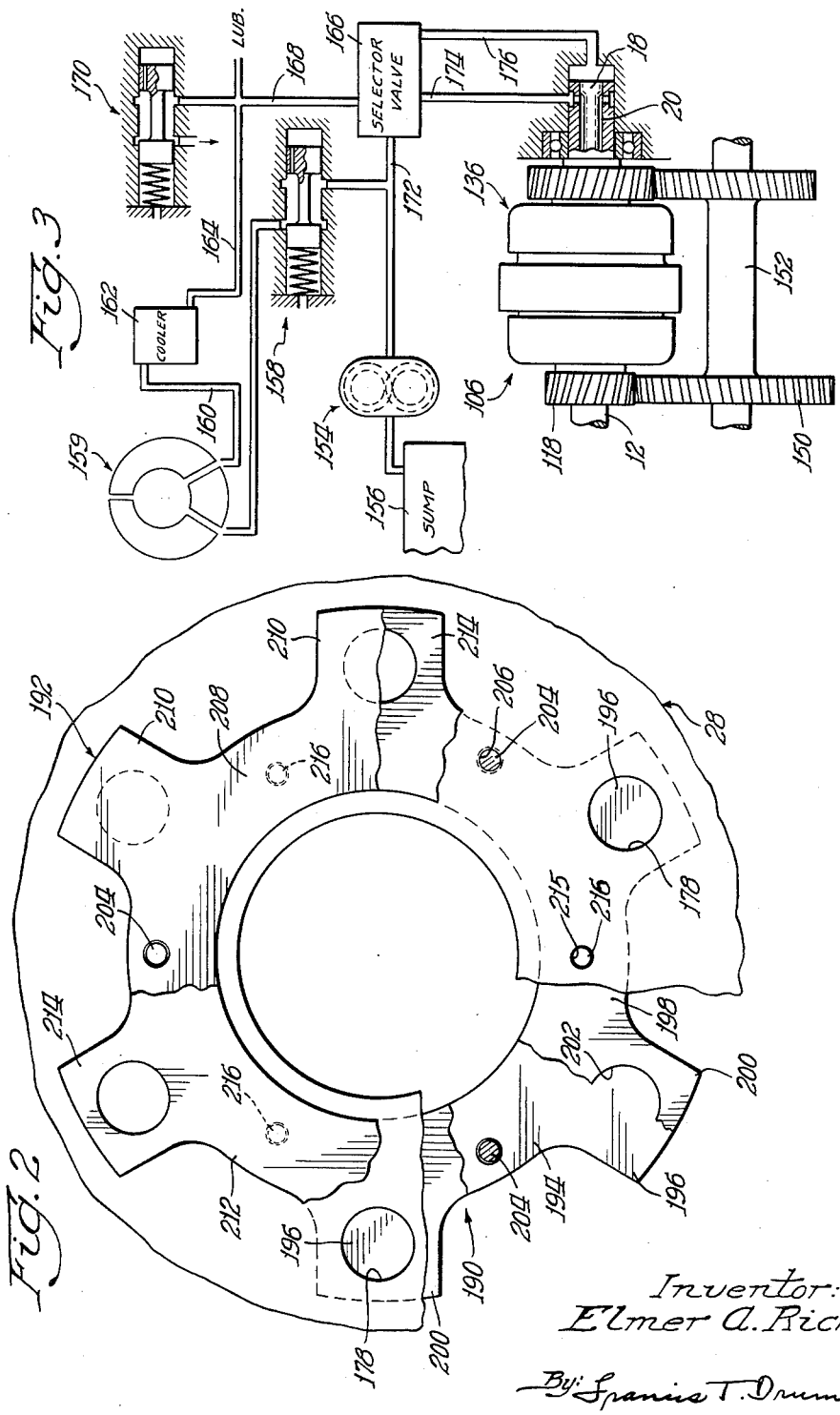

3,032,157
DOUBLE ACTING CLUTCH
Elmer A. Richards, Rockford, Ill., assignor to Borg-Warner Corporation, Chicago, Ill., a corporation of Illinois
Filed Dec. 18, 1959, Ser. No. 860,529
10 Claims. (Cl. 192—87)

This invention relates to hydraulically operated clutch mechanisms and more particularly to a hydraulically operated clutch mechanism of the double acting type for selective operation of either of a pair of opposed clutch packs.

This application is an improvement over the double acting clutch disclosed and claimed in the co-pending application of Joseph B. Snoy and myself, Serial No. 593,479, filed June 25, 1956, and entitled "Double Hydraulic Operated Clutch Device," now Patent No. 2,920,-732, granted January 12, 1960, and Patent No. 2,868,341 to Joseph B. Snoy, dated January 13, 1959.

A primary object of the invention is to provide a double acting clutch of the general type described in the above-identified co-pending application and patent but which is characterized by simplicity of design, ease of manufacture and rapidity of operation.

Another object of the invention is to provide a double acting clutch in accordance with the preceding object in which the time lag between successive engagements of the opposed clutch packs is reduced.

A more particular object of the present invention is to provide a double acting clutch of the type described in which two major chambers are provided one on each side of a central reaction plate and in which greatly simplified valving means are provided to control the interchange of fluid between the major chambers through suitable openings in the reaction plate.

A further particular object of the invention is to provide a double acting clutch of the mentioned character in which the major chambers are defined, in part, by major pistons of annular configuration and in which improved means are provided to return the major pistons to an inoperative position upon disengagement of the associated clutch pack.

This invention consists of the novel constructions, arrangements and devices to be hereinafter described and claimed for carrying out the above stated objects and such other objects as will be apparent from the following description of preferred forms of the invention, illustrated with reference to the accompanying drawings, wherein:

FIGURE 2 is an elevational view taken on substantially line 2—2 of FIGURE 1 and

FIGURE 3 is a diagrammatic view illustrating the general environment in which the clutch of the present invention may be utilized.

Figure 1:
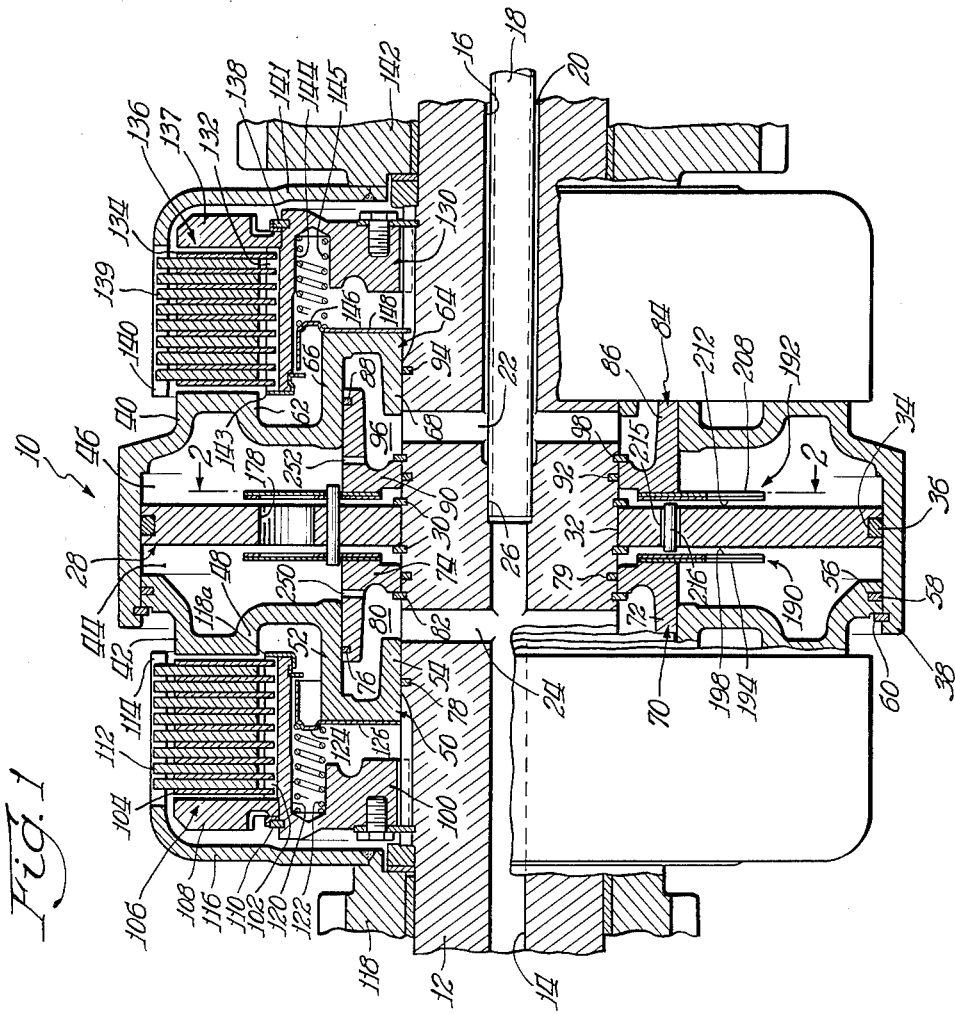
FIGURE 1 is a vertical sectional view of a double acting clutch made in accordance with the present invention.

Referring now to the drawings and more particularly to FIGURE 1, the clutch of the present invention is indicated generally by reference numeral 10 and is shown in operative relation to a rotatable shaft 12 which is adapted for connection with a suitable prime mover such as an internal combustion engine or the like. The shaft 12 is provided with an elongated bore 14 and a counterbore 16. Disposed within the counterbore 16, and extending partially into the bore 14, is an imperforate tube 18 which defines an annular passage 20. In fluid communication with the passage 20 are a plurality of circumferentially spaced radial passages 22 extending to the outer periphery of the shaft 12. A plurality of circumferentially spaced radial passages 24, spaced longitudinally from the passages 22, extend from the bore 14 to the outer periphery of the shaft 12 and are in fluid communication with the interior of the tube 18. It will be noted that the passages 24 and the bore 14 are not in fluid communication with the annular passage 20 because of the fluid tight engagement of the left end, as viewed in FIGURE 1, of the tube 18 with the bore 14 as at 26.

Mounted upon the shaft 12 for rotation therewith is an annular reaction plate 28 which is mounted in the axial position illustrated by means of snap rings 30. The plate 28 has an inner periphery 32 which snugly engages the outer periphery of the shaft 12 so that rotation of the shaft affects rotation of the plate. At the outer periphery of the plate 28 is an annular groove 34 in which is received a sealing ring 36 which is in sealing engagement with an annular axially extending flange 38 forming a part of a major piston 40 disposed at the right side of the plate 28, as viewed in FIGURE 1. At the opposite side of the plate 28 is a second major piston 42. The flange 38 forms, in effect, a hollow cylinder and the plate 28 generally divides the interior of this hollow cylinder in cooperation with the major pistons 42 and 40 into major chambers 44 and 46.

The major piston 42 is mounted on the shaft 12 in a manner that axial movement is afforded and is formed with an axially extending annular ridge 48 for a purpose hereinafter to be described, and an axially extending hollow hub portion 50, defined in part, by a cylindrical portion 52 and a cylindrical portion 54 of less axial extent. The outer periphery of the piston 42 is formed with an annular groove 56 for reception of a seal 58 and, in addition, a snap ring 60 is mounted within a suitable groove at the inner periphery of the flange 38 to limit relative axial movement between the piston 42 and the flange 38 and to afford simultaneous movement of the pistons 42 and 40 in a manner hereinafter described.

The piston 40 is likewise formed with an annular ridge 62 extending oppositely to the ridge 48 of the piston 42 and an axially extending hub portion 64, defined in part, by a cylindrical portion 66 and a cylindrical portion 68 of less axial extent.

Also mounted on the shaft 12 for limited axial movement with respect thereto is a minor piston 70 having an axially extending annular ledge 72 integral with a radially extending portion 74. The outer periphery of the ledge 72 is suitably grooved for reception of a seal ring 76 which sealingly engages the inner periphery of the axial portion 52 of the hub section 50. Also, shaft seals 78 and 79 are provided to afford fluid tight sealing of a first minor chamber 80 defined by the minor piston 74 and the hub section 50 of the major piston 42. A snap ring 82 limits axial movement of the minor piston 74 to the left, as viewed in FIGURE 1.

In like manner a second minor piston 84 is mounted for limited axial movement on the shaft 12 on the right side of the reaction plate 28, as viewed in FIGURE 1. The piston 84 has an axially extending ledge 86 which is suitably grooved for reception of the sealing ring 88 for prevention of fluid passage between the outer periphery of the ledge and the inner periphery of the axially extending portion 66 of the hub section 64. An axial extending portion 90, integral with the ledge 86, has an inner periphery engagement with the outer periphery of the shaft 12. A sealing ring 92 is provided for the portion 90 and likewise a sealing ring 94 prevents passage of fluid between the portion 68 of the hub section 64 and the shaft 12. The minor piston 84 and the hub section 64 define a second minor chamber 96. Axial movement of the piston 84 to the right, as viewed in FIGURE 1, is limited by a snap ring 98.

Splined to the shaft 12 at the left side of the major piston 42, as viewed in FIGURE 1, is a disc hub 100, annular in configuration and having at its outer periphery a series of splines 102 on which are mounted for limited axial movement a plurality of clutch discs 104 forming part of a disc pack generally indicated by reference numeral 106. To the left of the disc pack 106 is an annular block 108 mounted in position by means of a snap ring 110. Also forming a part of the disc pack 106 are a plurality of clutch discs 112, interleaved with the clutch disc 104 and having at their outer peripheries a series of circumferentially spaced lugs received in axially extending slots 114 in a clutch drum 116. The clutch drum 116 is illustrated as being secured, as by welding or the like, to a gear 118. The clutch discs 104 and 112 are retained by means of an annular spring clip 118a. Formed in the hub 100 are a plurality of circumferentially spaced recesses 120 in each of which is received one end of a helical spring 122, the other end of which abuts against a boss 124 formed in an annular retainer ring 126.

On the right side of the reaction plate 28, as viewed in FIGURE 1, is a hub 130 which, as in the case of the hub 100, may be fixed to the shaft 12, as by splining or the like. The hub 130 has at its outer periphery a series of splines 132 on which are mounted for limited sliding movement a plurality of clutch discs 134 forming part of a disc pack 136. Also forming part of the clutch pack 136 is an annular block 137 retained in position by means of the snap ring 138. Interleaved with the clutch discs 134 are a plurality of clutch discs 139 which are provided at their outer peripheries with a series of circumferentially spaced lugs received in slots 140 in a clutch drum 141. The clutch drum 141 is illustrated as being secured, as by welding or the like, to an output gear 142. An annular spring clip 143 retains the clutch discs 134 and 139 in the assembled relation illustrated. Also formed in the hub 130 are a plurlity of circumferentially spaced recesses 144 in each of which is received one end of a helical spring 145. The opposite ends of each of the helical springs 145 are mounted in surrounding relation to one of a series of circumferentially spaced bosses 146 on an annular retainer ring 148.

In FIGURE 3 is shown schematically an operative system employing the device of the present invention. In that figure, shaft 12 is illustrated as carrying the clutch packs 106 and 136 and the other elements previously described. Gear 118 is illustrated in meshing relation with the gear 150, the latter being mounted upon a suitable countershaft 152 so that upon engagement of the clutch pack 106 power may be transmitted from the engine, through the shaft 12, the clutch pack 106, gear 118, gear 150 and countershaft 152 to the drive wheels, to which the countershaft 152 is connected by any suitable means (not shown). The manner by which the clutch pack 106 may be engaged will now be described, it being understood that the clutch pack 136 may be similarly engaged for effecting the selection of desired gear ratios in a transmission of the countershaft type, as explained fully in the above mentioned co-pending application Serial No. 593,479 and Patent No. 2,868,341. In the system illustrated hydraulic fluid may be drawn by means of a pump 154 from a sump 156. The discharge pressure may be regulated by a regulating valve 158 which also supplies fluid at a desired pressure to a torque converter 159 from which the fluid may flow by means of a conduit 160 to a heat exchanger 162. From thence the fluid may flow by means of a conduit 164 to lubrication and other uses and to a selector valve 166 through the medium of a conduit 168. The lubrication fluid pressure and the fluid in the conduit 168 may be regulated to a desired lower pressure by means of a regulating valve 170. The fluid controlled by the selector valve 166 may flow by means of the conduit 172 to the selector valve 166 which is of the type described and claimed in the application Serial No. 703,361, now Patent No. 2,979,963. The selector valve 166 is provided with an output conduit 174 and an output conduit 176 which, as clearly seen in FIGURE 3, are respectively in fluid communication with the annular passage 20 and the interior of the tube 18. The conduits 174 and 176, as explained fully in application Serial No. 703,361 alternately transmit high and low pressure fluid.

According to the present invention, novel one-way valve means are provided to afford free fluid communication between the major chamber 46 and the major chamber 44 through a series of circumferentially spaced openings 178 in the reaction plate 28, during engagement of the disc pack 106 by movement of the major piston 42 into engagement therewith in a manner hereafter described. Likewise, the present one-way valve means affords one-way communication between the major chamber 44 and the major chamber 46 through a opening 178 in the reaction plate 28, when the disc pack 136 is engaged by the annular ridge 62 of the major piston 40 in a manner hereafter described.

A one-way valve assembly 190 is disposed within the major chamber 44 and a one-way valve assembly 192 is disposed in the major chamber 46. The valve assembly 190 includes an annular disc or carrier plate 194 provided with a plurality of circumferentially spaced tangs or resilient portions 196 and an annular disc or carrier plate 198 having a plurality of circumferentially spaced tangs 200. Each of the tangs 200 is formed with an opening 202 corresponding in diameter to the diameter of the openings 178 in the reaction plate 28. The disc 194 and the disc 198 is slidably mounted on a plurality of pins 204 mounted in circumferentially spaced openings 206 in the barrier plate 28. The disc 194 is preferably of relatively thin sheet material so that the tangs thereof function as reeds.

The one-way valve assembly 192 includes an annular disc or carrier plate 208 of relatively thin sheet material provided with a plurality of circumferentially spaced tangs or resilient portions 210. An annular disc or carrier plate 212 of relatively thick material is interposed between the disc 208 and the barrier plate 28 and is provided with a plurality of circumferentially spaced tangs 214 one each in register with the tangs 210 of the disc 208. The discs 208 and 212 are formed with suitable registering openings for reception of the pins 204. It will be appreciated that the pins 204 maintain the discs of the several one-way valve assemblies at the radial position illustrated by means of the pins 204.

Also formed in the barrier plate 28 are a plurality of circumferentially spaced openings 215 in each of which is received a slidable pin 216 the ends of which are adapted to abut against the disc.

In operation, the disc pack 106 may be engaged for rotation of the gear 118. Fluid under high pressure may be introduced into the minor chamber 80 from the tube 18, the bore 14 and the passages 24 in the manner set forth above for pressurization of the minor chamber 80. When this minor chamber is pressurized the minor piston 74 is moved to the right, as viewed in FIGURE 1 and the one-way valve assembly 190 is moved into operative position with the tangs 200 arranged to afford the flow of fluid between the chamber 46 and the chamber 44. Additional pressurization of the minor chamber 80 affects movement of the major piston 42 to the left so that the annular ridge 48 engages the disc pack 106 and the springs 122 are compressed. As the major piston 42 moves to the left, the major piston 40 is moved in the same direction, thus forcing the fluid from the chamber 46 to the chamber 44. When the ridge 48 engages the disc pack 106 further movement of the major piston 42 is precluded and fluid flow from the major chamber 44 to the major chamber 46 is prevented by the one-way valve assembly 190. The disc pack 106 is then locked up by the introduction of additional fluid and pressure into the chamber 44 through circumferentially spaced radial passages 250 in the ledge 72.

Engagement of the disc pack 136 may be effected by transmittal of fluid under high pressure through the annular passage 20 and the radial passages 22 to the minor chamber 96. The one-way valve assembly 192 is moved into operative position with respect to the blade 28, fluid flows between the chamber 44 and the chamber 46 because of simultaneous movement of the piston 42 with the piston 40 and the chamber 46 may be additionaly pressurized by the passage of high pressure fluid through circumferentially spaced radial passages 252 in the ledge 86.

It will be noted that during the course of movement of the one-way valve assembly 190 to the operative position, the one-way valve assembly 192 is moved to the right, as viewed in FIGURE 1, by means of the pins 214, thus permitting free fluid flow. In a similar manner, the one-way valve assembly 190 is moved to the left, as viewed in the same figure, by the pins 214, when the one-way valve assembly 192 is moved to the operative position. The discs 198 and 212 function to back up the discs 194 and 208 to provide the requisite rigidity to permit actuation in the manner above set forth. It will be appreciated that the pistons 40 and 42 are returned to the position illustrated in FIGURE 1 by means of the springs 122 and 145, respectively.

While I have described the invention in connection with specific constructions and arrangements, it is to be understood that this is by way of illustration and not by way of limitation and the scope of the invention is defined solely by the appended claims which should be construed as broadly as the prior art will permit.

I claim:
1. In a hydraulically operable clutch assembly, a housing, clutch means, spaced piston means movable to engage said clutch means, reaction means defining a plurality of first chamber means with said piston means and said housing, a plurality of one-way valve means extending between said plurality of said first chamber means, certain of said valve means preventing fluid flow in one direction only and other of said valve means preventing fluid flow in the opposite direction only, each of said one-way valve means comprising an annular disc movable from a first position in which fluid flow between said first chambers is freely permitted to a second position in which fluid flow between said first chamber is permitted in only one direction, and other piston means defining a plurality of other chamber means with said first mentioned piston means, said other piston means being movable in response to a predetermined pressure condition in said other chamber means to effect movement of said one-way valve means from one position to the other and vice versa.

2. A hydraulically operable clutch assembly in accordance with claim 1 wherein movement of one of said one-way valve means to one position effects movement of the other of said one-way valve means to the other position.

3. In a hydraulically operable clutch assembly, a housing, clutch means, spaced piston means movable to engage said clutch means, reaction means defining a plurality of first chamber means with said piston means and said housing, a plurality of openings in said reaction means affording fluid communication between said first chamber means, a plurality of one-way valve means each movable from an inoperative position to a position in which fluid flow between said first chamber means in one direction is afforded, and other piston means defining a plurality of other chamber means with said first mentioned piston means and movable selectively into engagement with said one-way valve means to move said one-way valve means into the operative position.

4. A hydraulically operable clutch assembly in accordance with claim 3 wherein movement of one of said one-way valve means to the operative position effects movement of the other of said one-way valve means to the inoperative position.

5. In a hydraulically operable clutch assembly, a housing, clutch means, spaced piston means movable to engage said clutch means, reaction means defining a plurality of first chamber means with said piston means and said housing, a plurality of circumferentially spaced openings extending through said reaction means, other piston means defining a plurality of other chamber means with said first mentioned piston means, one-way valve means disposed in each of said first chamber means and movable by said other piston means in response to a predetermined pressure condition in said other chamber means from an inoperative position to an operative position in engagement with said reaction means, said one-way valve means being operative in said latter position to afford a unidirectional flow of fluid between one of said first chamber means and the other of said first chamber means.

6. A hydraulically operable clutch assembly in accordance with claim 5 wherein each of said one-way valve means includes an annular disc having a plurality of circumferentially spaced radially outwardly extending tangs in register one each with the openings in said reaction means.

7. A hydraulically operable clutch assembly in accordance with claim 6 wherein a plurality of openings are formed in said reaction means, wherein a pin is slidably received in each of said openings and wherein the disc of one of said one-way valve means may be moved into the inoperative position by movement of the other of said one-way valve means to the operative position.

8. In a hydraulically operable clutch assembly, including a shaft adapted for rotation, the combination comprising: a pair of spaced clutch packs mounted upon said shaft and adapted to transmit rotative drive; a fluid operated hollow piston means slidably mounted on said shaft between said packs and adapted to move axially for application of clutch engaging force to each of said packs; a reaction plate dividing the interior of said hollow piston means and being fixedly secured to said shaft against axial movement thereon, said reaction plate having a plurality of openings communicating opposite sides thereof; means providing fluid pressure for alternately applying pressure to opposite sides of said reaction plate and to move said piston means; and valve means co-operating with said reaction plate for maintaining constant fluid volume within said piston means during movement of said piston means, said valve means comprising a pair of carrier plates with one on each side of the reaction plate, each carrier plate having a plurality of resilient portions with one each of said portions being aligned with one of said openings in said reaction plate, said carrier plates being slidable on said shaft in fixed spaced relation, each resilient portion being operable as a one way valve upon engagement of one of said carrier plates with said reaction plate whereby resilient portions on said one carrier plate cover said openings and are lifted from such covering position only by fluid pressure directed in one direction, and actuator means responsive to fluid pressure for moving said piston means so as to move one of said carrier plates into engagement with said reaction plate.

9. The combination of claim 8 in which said piston means comprises a first annular slidable plate member having an annular axially extending flange and a second annular plate member having its outer periphery in engagement with said flange and secured thereto against relative axial movement.

10. The combination of claim 8 in which each said carrier plate has two plies, one ply being of thin flexible material having said resilient portions and the other being of thick stiff material, said thick ply having openings respectively aligned with said one ply's resilient portion and aligned with said reaction plate openings so that only said resilient portions of said thin ply are flexed to one way valves.

References Cited in the file of this patent
UNITED STATES PATENTS

| | | |
|---|---|---|
| 2,701,042 | Kurzweil | Feb. 1, 1955 |
| 2,868,341 | Snoy | Jan. 13, 1959 |
| 2,920,732 | Richards et al. | Jan. 12, 1960 |